INVENTORS
Edward T. George
Irving Allen
BY Rockwell and DeLio
ATTORNEYS

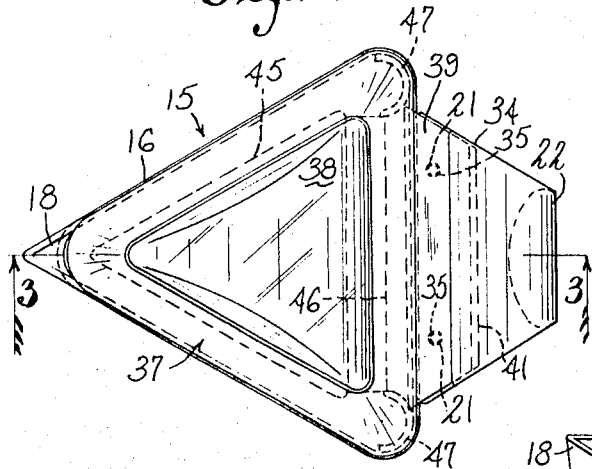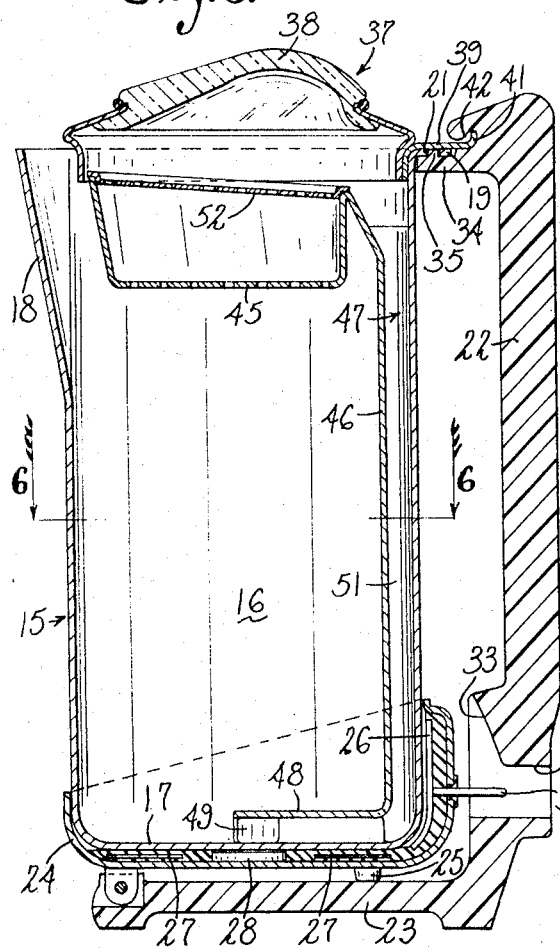
INVENTORS
Edward T. George
Irving Allen

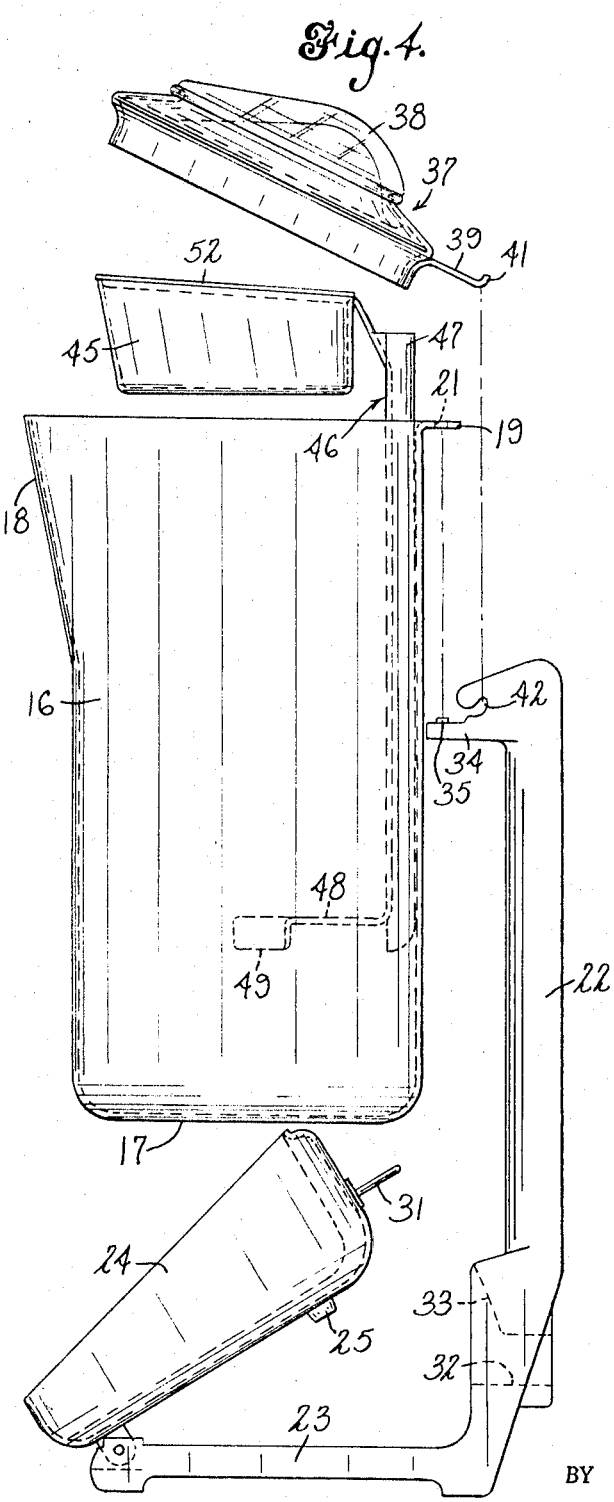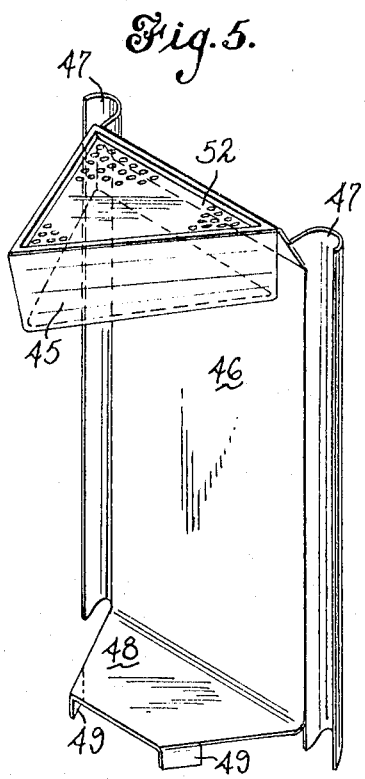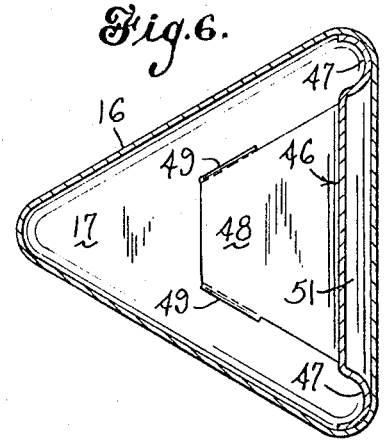
INVENTORS
Edward T. George
Irving Allen

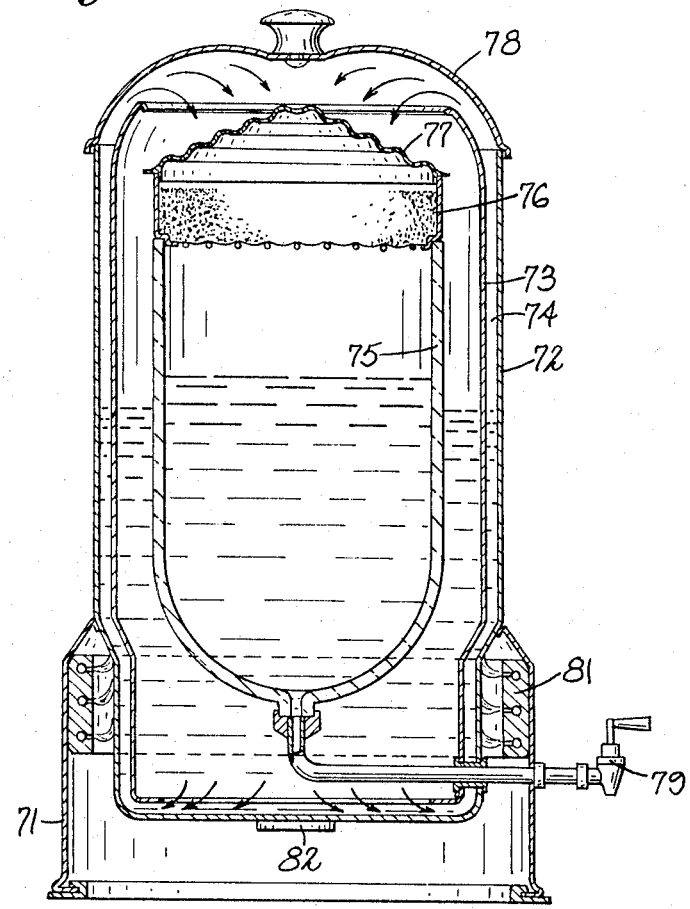

United States Patent Office 3,453,947
Patented July 8, 1969

3,453,947
COFFEE MAKER
Edward T. George and Irving Allen, Hamden, Conn., assignors to Connecticut Scientific Center, Inc., New Haven, Conn., a corporation of Delaware
Continuation of application Ser. No. 387,930, Mar. 31, 1964. This application May 18, 1967, Ser. No. 649,770
Int. Cl. A47i 31/44
U.S. Cl. 99—308                    6 Claims

ABSTRACT OF THE DISCLOSURE

A coffee maker apparatus comprising in combination, a container having bottom and side walls defining a liquid reservoir, an inner member defining with a side wall a channel extending from a point above said bottom wall to a point above said reservoir, a basket for holding coffee at the top of said container, and a container cover for directing fluid from said channel over said basket.

---

This patent application is a continuation of our pending patent application Ser. No. 387,930, filed Mar. 31, 1964, now abandoned.

This invention relates generally to coffee makers and, more particularly, to improved types of coffee makers utilizing a thermo-syphon principle to flow substantial and controlled amounts of water over and through ground coffee to thereby provide coffee of a more even consistency and to speed the cycle time for making coffee.

Most automatic coffee makers use the well known percolator principle which incorporates a small-diameter tube extending from the water reservoir to a point above the coffee basket. The lower end of the tube is generally flared to funnel into the tube bubbles of air caused by the boiling of the water in contact with the bottom of the coffee pot. The small bubbles combine to form large bubbles which completely fill the tube and, as they rise, force the water above the bubbles up through the tube and onto the coffee. As consecutive bubbles form, water will be forced up the central tube. Thus, percolation is an intermittent action with very small quantities of water being forced up the tube and onto the coffee in the coffee basket. Because of the percolating operation, a surprisingly small amount of water passes through the coffee to form a strong brew which is mixed with the water remaining in the reservoir to provide the strength desired. In the usual type of 8-cup, home coffee percolator, relatively small amounts of water are forced up through the tube and directed over the coffee. As may be readily understood, this process can be quite slow.

In the industrial field, reboilers using a thermosyphoning principle, are capable of delivering large quantities of fluid from the heat exchanger. By boiling the fluid in the heat exchanger, a substantial amount of vapor is dispersed through the fluid thus creating, broadly speaking, a homogeneous fluid-vapor mixture. The fluid-vapor mixture has a low density as compared with the original fluid, thereby causing a rise in the fluid level in the heat exchanger. This rise, coupled with the escaping vapor, carries with the vapor substantial quantities of fluid and it is this principle which is incorporated in the coffee makers hereafter described.

Accordingly, it is an object of this invention to provide an improved coffee maker which passes substantial quantities of water over the basket containing the ground coffee.

Another object of the invention is to provide a coffee maker incorporating the principle of operation of thermosyphon reboilers to shorten the coffee making cycle.

Another object of this invention is to provide a coffee maker which operates in such a manner that substantially all or a major portion of the water which becomes coffee passes through the ground coffee.

A still further object of the invention is to provide a coffee maker assuring greater uniformity of coffee strength.

Still other objects and advantages of the invention will in part be obvious and will in part be apparent from the specification.

Generally speaking, in accordance with one form of the invention, a basket for ground coffee is suspended above a water reservoir. A large channel is defined along a wall of the reservoir chamber to convey the water from the reservoir to a point above the basket so that water may pass through the basket and through the ground coffee therein. Heating means is provided to heat only the water in the lower part of the channel so that the water will rise in the channel, utilizing the principle of a thermosyphon reboiler. Water will rise continuously in the channel and fall on the basket. Since a great amount of water will fall on the basket, the water which cannot pass through the basket due to excess volume, falls back into the chamber reservoir. The water in the reservoir is heated by the water passing through the channel and a suitable thermostat causes cessation of the circulation cycle when the water reaches the desired temperature.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

FIG. 1 is a perspective view of one form of a domestic coffee maker constructed in accordance with the invention;

FIG. 2 is a top plan view of the coffee maker of FIG. 1;

FIG. 3 is a sectional view taken along line 3—3 of FIG. 2;

FIG. 4 is an exploded side elevational view of the coffee maker shown in FIG. 1;

FIG. 5 is a perspective view of the coffee maker basket and channel member forming a part of the coffee maker;

FIG. 6 is a sectional view taken along line 6—6 of FIG. 3;

FIG. 12 is a sectional elevational view of a commercial form of a coffee maker constructed in accordance with the invention.

Figure 7:
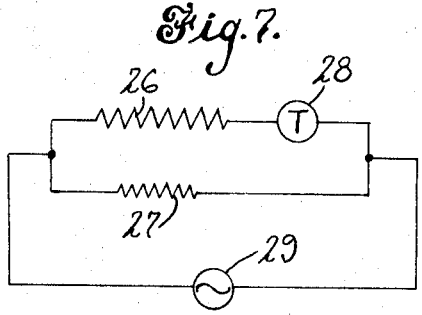
FIG. 7 is a schematic diagram of the circuitry for the electrically operated coffee maker shown in the preceding figures.

Referring now to FIGS. 1 through 7, one form of the coffee maker, indicated generally at 15, is triangularly shaped. A three-sided triangular container 16 has a flat bottom 17 and a spout portion 18 to assist in the pouring of coffee. The top edge lip 19 of the rear side of the container projects outwardly from the rear side and is provided with a pair of spaced apertures 21 whose use will be hereafter described.

The handle and heating elements of the coffee maker are separate from the container, so that the container may be fully immersed in water for cleaning. Handle 22 may be molded integrally with base 23 and will preferably be of an insultaing and non-conducting material such as any one of the large variety of plastics or resins in use today. A carrier 24 is pivoted at its forward end to the forward end of base 23 and is provided with a leveling foot 25 adapted to rest on base 23 when the carrier is in the operative position shown in FIG. 3. Carrier 24 has mounted therein a major heating element 26 adapted to overlie the lowermost portion of the rear side of container 16. Carrier 24 also includes a pair of warming elements 27 which merely function to maintain the temperature of the coffee at the desired level once the coffee has been brewed. A thermostat 28 is also carried by carrier 24 and is adapted to contact the bottom of container 16 to respond to the temperature of the coffee in the container. Heating element 26, warming elements 27 and thermostat 28 are interconnected within the carrier in a circuit schematically shown in FIG. 7, which also includes an energy source 29. The energy source is supplied to the carrier circuitry through a pair of projecting pins 31 by connection of the pins through a suitable cord to the usual electric outlet. As shown in FIG. 7, heating elements 27 remain warm whenever the energy source is applied to the circuit. The major heating element 26 is in series with thermostat 28 and, thus, when the temperature in the container reaches the operating temperature of the thermostat, the circuit through heating element 26 will be broken to thereby stop the brewing cycle which will be described in greater detail hereafter. Handle 22 is provided with an aperture 32 opposite projecting pins 31 for receiving a mating plug (not shown) on an electrical cord. Aperture 32 has an arcuate cut-away portion 33 to provide clearance for projecting pins 31 when the carrier is pivoted about base 23 to permit access for cleaning of the base.

The upper end of handle 22 is provided with an inwardly projecting extension 34 which has a flat upper surface adapted to receive and support the projecting lip 19 of the container. Extension 34 carries a pair of upwardly projecting pegs 35 which are spaced to be received in the apertures 21 in projecting lip 19. In this manner, removable container 16 is properly aligned relative to the handle and base.

A top 37, having a triangular shape, is adapted to mate with and be inserted in container 16. A slight interference fit is provided so that the top will not fall off when the coffee maker is inverted for pouring. If desired, the top may be provided with a glass portion 38, as is usual with coffee makers. The rear side of top 37 is provided with a rearwardly extending plate 39 having an upwardly-turned, hooked end 41 which mates with a groove 42 in the extension 34 of the handle. As will be apparent from FIGS. 3 and 4, the top is rotated into place about the pivot formed by the cooperation between hooked end 41 and groove 42 and, when the top is firmly in place, plate 39 overlies lip 19 to firmly lock the container in the assembled position.

The basket member consists of a coffee basket 45 suspended from a vertical plate 46 which is formed integrally with a pair of vertical channels 47. The lowermost end of plate 46 is bent to form a foot member 48 adapted to overlie a portion of the bottom of the container. Projections 49 extend from foot member 48 below the foot member by the same amount as channels 47 extend below the foot member. These projecting members hold the foot member in spaced relation with the bottom of the container, as best seen in FIG. 3. Channels 47 extend behind plate 46 and follow the curvature of the rear corners of the coffee maker as shown in FIG. 2. The channels hold plate 46 in spaced relation with the rear wall of the container to define a vertical thermo-syphon chamber 51 isolated from the interior of the container. Coffee basket 45 is provided with a cover 52 and both the cover and base of the coffee basket are perforated to permit the passage of water therethrough. The ground coffee, from which the coffee is brewed, is placed in the coffee basket, the quantity being determined by the number of cups of coffee to be brewed.

The operation of the form of the domestic coffee maker shown in FIGS. 1 through 7, will now be described in greater detail. Chamber 16 is filled to the desired level with cold water from the tap and the container is placed in carrier 24 with lip 19 engaging the extension of handle 22. The desired amount of ground coffee is placed in basket 45 and the entire basket member is inserted into the container.

Thereafter, the top is placed on the container so as to lock the units together. Current is supplied to the heating elements in the carrier through pins 31 and a substantial amount of heat is applied, through the wall of the container, to the water in chamber 51. A small amount of heat is also applied to the water in the container through warming elements 27, but during the initial brewing of the coffee these warming elements have substantially no effect on the operational cycle. The water in chamber 51 is caused to boil violently, thereby producing a vapor-liquid mixture of light density as compared with the liquid in the container. The head of liquid in the container raises the level of the lighter mixture in the channel commencing the circular flow of fluid and vapor. The vapor carries with it substantial quantities of fluid which strike the inner surface of top 37 and are deflected down over the coffee basket. In an attempt to come to equilibrium, the circular flow continues and water continuously flows over the coffee basket. In fact, the quantity of water has proven to be so great that the basket is of smaller size than the container opening to permit excess water to return into the main reservoir of the container. This is most clearly shown in FIG. 2.

Controlled amounts of water pass through the coffee basket to brew the coffee. The water heated in the channel is collected in the main body of the container and raises the temperature of the water remaining in the container from the top down. This produces stratification in such a way that the thermostat senses the lowest temperature in the vessel. When the brewed coffee reaches a preselectd temperature, thermostat 28 breaks the circuit supplying current to heating element 26. At this point, the temperature of the coffee will be quite uniform from top to bottom because of the introduction of the heated fluid from the top of the coffee maker, rather than from the bottom, as occurs in the usual type of percolator. Warming elements 27 maintain the temperaturer of the coffee as long as desired. The continuous flow of water over the basket caused by the thermo-syphon action within the channel, causes the coffee to be brewed at a very rapid rate. Utilizing this novel coffee maker, substantial savings in time have been effected over those coffee makers presently in use which incorporate the percolator principle. In the percolator principle, the flow of water over the coffee is periodic or intermittent, and the bulk of the water is primarily heated by natural convection only, thereby greatly increasing the time required to brew coffee to the desired strength and temperature.

Figure 8:
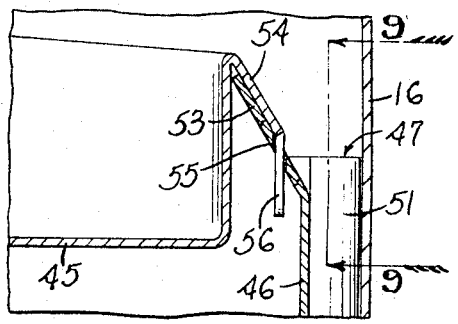
FIG. 8 is a partial sectional view of an alternate construction of the basket and channel member.
Figure 9:
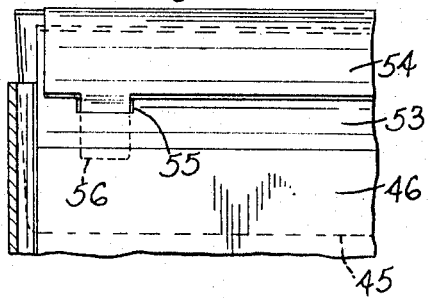
FIG. 9 is a partial sectional view taken along line 9—9 of FIG. 8.

An alternate construction of the basket member is shown in FIGS. 8 and 9, wherein the coffee basket 45 may be removably mounted to plate 46. In this construction, the upper end 53 of plate 46 extends at an angle to the plate away from the rear wall of the container. A depending plate 54 extends downwardly from the rear upper edge of the coffee basket, at an angle complementary to the angle of upper end 53. Upper end 53 is provided with a plurality of rectangular apertures 55 through which pass tabs 56 depending from plate 54. Utilizing this construction, the coffee basket is properly supported within the container and yet may be easily removed and disconnected from the entire basket member to simplify cleaning or replacement.

Figure 10:
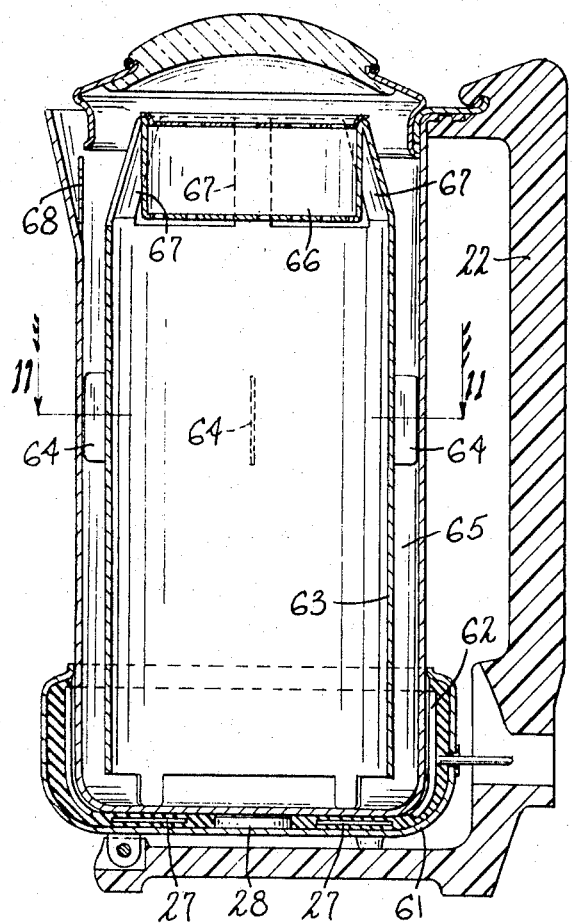
FIG. 10 is a sectional elevational view of another form of a domestic coffee maker.
Figure 11:
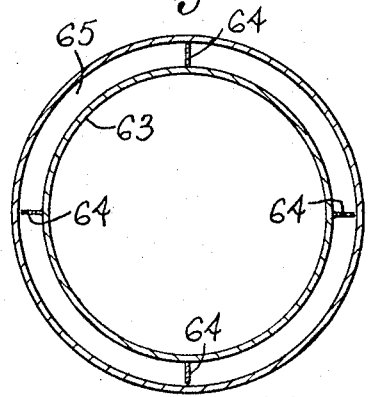
FIG. 11 is a sectional view taken along line 11—11 of FIG. 10.

Another form of a domestic coffee maker is shown in FIGS. 10 and 11. In contrast to the form having a triangular cross-section, this form has a circular cross-section, as clearly shown in FIG. 11. In this form, carrier 61 is similar to carrier 24 of the previous form, with the exception that major heating element 62 is circular and extends along the entire outside portion of the container. The basket member consists of a tubular section 63 adapted to be centralized and spaced from the inner surface of the container by a plurality of projections 64, thereby defining a thermo-syphon channel 65 for the delivery of water from the reservoir within the main portion of the container. A coffee basket 66 is supported from tubular section 63 by means of a plurality of ribs 67, leaving substantial cut-away portions around the outside periphery of the coffee basket to permit the return of excess water. In all other respects, the construction of the circular coffee maker is similar to that of the triangular coffee maker, and the operation thereof is the same as that previously described. The container is provided with a baffle 68 having a plurality of apertures therethrough, to prevent escape of fluid during the brewing cycle and to permit pouring of the brewed coffee.

The two embodiments heretofore described are especially adapted for domestic use and include electric heating elements to provide a self-contained electric coffee maker. In order to operate properly, heat must be applied to the water within channel 51 or channel 65 and, it would be possible to construct a coffee maker in accordance with the invention adapted to be heated on a gas or electric kitchen range. Particularly with reference to the FIG. 10 embodiment, this would require an extension of channel 65 at least along a portion of the bottom of the container placed directly on the range.

The principle of operation discussed herein is equally adaptable to commercial types of coffee makers and one such construction is shown in FIG. 12. The coffee maker includes a base 71 carrying an outer cylinder 72 which is sealed at the bottom and which forms the outside of the coffee maker. An inner cylinder 73 which is open at the top and bottom, generally conforms to the configuration of the outer cylinder, but is spaced therefrom to define a chamber 74 in which the thermo-syphon action takes place. Well within the inner cylinder is a cylindrical container 75 having a hemispherical bottom. The top of cylindrical chamber 75 supports a coffee basket 76, including a perforated cover 77. A removable top 78 fits over the upper edge of outer cylinder 72. A suitable valve 79 is connected to the bottom of cylindrical container 75 for drawing off the brewed coffee. Heating means 81, carried by the base, encircle the lower portion of outer cylinders 72 within the area of the lowermost sections of chamber 74 to commence the cyclical operation of the coffee maker. As shown, heating means 81 comprises gas jets for connection to a gas line. However, it will be understood that electrical heating means could be substituted as required for the particular environmental application. A thermostat 82 is secured to the bottom of outer cylinder 72.

The operation of the commercial coffee maker shown in FIG. 12 and described above is as follows. The reservoir formed by the outer cylinder is filled with water to the desired level. Fresh ground coffee is placed in the coffee basket which is thereafter covered and the top of the coffee maker is put in place. Heating means 81 is raised to a maximum, thereby heating the water in chamber 74 and causing rapid boiling to take place. Since the water in the reservoir can only enter the chamber along the bottom of the outer cylinder, the mixture of vapor and water in the chamber causes a decrease in density and causes the mixture to rise and the vapor to carry with it substantial amounts of water which are deflected downwardly by top 78 onto coffee basket cover 77. Most of the water passes up and over the basket containing the ground coffee and collects in cylinder container 75. A controlled amount of water passes through the ground coffee and any excess water falls back into the reservoir. The level of coffee in the cylindrical container will be a function of the temperature of the water in the reservoir and, thus, thermostat 82 can be set to reduce the amount of heat supplied by the heating means when the water has reached the desired level. Alternately, other means responsive to level or temperature can be used. Also, visual glass tubes can be connected to both the reservoir and cylindrical container to visually display the amount of fluid in each.

Brewed coffee is drawn off through valve 79. After the coffee is brewed, a small amount of heat is supplied by heating means 81 to maintain the water in the reservoir and the coffee in the cylindrical container at the desired temperature level. When it is desired to make additional coffee, the operator need only refill the coffee basket with fresh ground coffee and raise the temperature of the heating means. Since the water in the reservoir has been preheated, the brewing cycle will be even shorter than the cycle when the water in the reservoir is cold. A coffee maker constructed as described, will brew coffee quite rapidly, as compared with known devices because of the substantial quantities of hot water that are pumped through the brewing area and delivered over the coffee basket.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A coffee maker apparatus comprising in combination a container having bottom and side walls defining a liquid reservoir an inner member defining with a side wall a channel extending from a point above said bottom wall to a point above said reservoir, a basket for holding coffee at the top of said container, a container cover for directing fluid from said channel over said basket and a top edge lip on said container having aperture means formed therein.

2. A coffee maker apparatus in accordance with claim 1, wherein said cover is provided with a rearwardly extending plate having an upwardly-turned hooked end.

3. A coffee maker apparatus in accordance with claim 2, including a base support, a carrier shaped to mate with the shape of the container base and supported by the base support, said base support provided with a handle for carrying said base, carrier and container.

4. A coffee maker apparatus according to claim 3, wherein said handle includes a projecting peg means for holding said container lip and a groove for retaining said cover plate over said container lip.

5. A coffee maker apparatus according to claim 3, including electric heater element means extending along the base and side of the carrier.

6. A coffee maker apparatus comprising in combination a container having bottom and side walls defining a liquid reservoir, an inner member defining with a side wall a channel extending from a point above said bottom wall to a point above said reservoir, a basket for holding coffee at the top of said container, a container cover for directing fluids from said channel over said basket, and in which the container has the shape of substantially a triangular prism and in which the inner member has a vertical plate and two vertical channels for spacing the vertical plate from the side wall, and in which the channels are shaped to set against the rear wall of one side such that the other side will prevent the inner member from moving laterally, said inner member being provided with projecting means to raise it off the base of the container.

References Cited

UNITED STATES PATENTS

| | | |
|---|---|---|
| 491,478 | 2/1893 | Goodwyn. |
| 741,196 | 10/1903 | Vogan. |
| 1,385,453 | 7/1921 | Holman. |
| 1,431,603 | 10/1922 | Sprague. |
| 1,963,950 | 6/1934 | Anderson. |
| 2,455,660 | 12/1948 | Dunlop. |
| 2,604,031 | 7/1952 | Campbell. |

ROBERT W. JENKINS, *Primary Examiner.*